(12) United States Patent
Huang et al.

(10) Patent No.: US 11,392,325 B2
(45) Date of Patent: Jul. 19, 2022

(54) METHOD AND SYSTEM FOR PARALLEL FLASH MEMORY PROGRAMMING

(71) Applicant: Quanta Computer Inc., Taoyuan (TW)

(72) Inventors: Chih-Chia Huang, Taoyuan (TW); Po-Wei Huang, Taoyuan (TW); Te-Hsien Lai, Taoyuan (TW); Yi-Hung Shen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/034,880

(22) Filed: Sep. 28, 2020

(65) Prior Publication Data

US 2022/0100421 A1 Mar. 31, 2022

(51) Int. Cl.
G06F 3/06 (2006.01)

(52) U.S. Cl.
CPC ............ *G06F 3/0659* (2013.01); *G06F 3/061* (2013.01); *G06F 3/0679* (2013.01)

(58) Field of Classification Search
CPC ....... G06F 3/0659; G06F 3/0679; G06F 3/061
See application file for complete search history.

(56) References Cited

U.S. PATENT DOCUMENTS

| | | | | |
|---|---|---|---|---|
| 4,969,134 A * | 11/1990 | Balderson | ................ | G04G 9/04 368/239 |
| 8,949,511 B2 * | 2/2015 | Ishikawa | ............... | G06F 3/0647 711/103 |
| 2007/0258298 A1 * | 11/2007 | Amidon | ................. | G11C 29/56 365/201 |
| 2009/0064124 A1 * | 3/2009 | Chung | ...................... | G06F 8/65 717/168 |
| 2012/0324246 A1 * | 12/2012 | Rahardjo | .................. | G06F 1/26 713/300 |

(Continued)

FOREIGN PATENT DOCUMENTS

| | | |
|---|---|---|
| CN | 110515641 A | 11/2019 |
| TW | 201712588 A | 4/2017 |
| TW | I653528 B | 3/2019 |

OTHER PUBLICATIONS

Zhang, Jie, et al. "Scalable parallel flash firmware for many-core architectures." 18th USENIX Conference on File and Storage Technologies (FAST 20). 2020. (Year: 2020).*

(Continued)

*Primary Examiner* — Francisco A Grullon
(74) *Attorney, Agent, or Firm* — Nixon Peabody LLP

(57) ABSTRACT

A system and method for simultaneously programming flash memory devices in a computing device is disclosed. The computing system includes a switching unit that includes an input and multiple outputs. The switching unit connects the input to one or more of the outputs. Each of the flash memory devices is coupled to one of the outputs of the switching unit. A control bus is coupled to the switching unit. The control bus carries a control signal to select one or more of the outputs for connection to the input. A programming interface bus is coupled to the input of the switching unit. A controller is coupled to the control bus and the programming interface bus. The controller selects the memory devices for providing programming over the programming interface bus.

18 Claims, 5 Drawing Sheets

(56) References Cited

U.S. PATENT DOCUMENTS

| | | | |
|---|---|---|---|
| 2013/0097363 A1* | 4/2013 | Tan | G06F 13/1684 |
| | | | 711/103 |
| 2016/0255740 A1* | 9/2016 | Ping | G06F 13/4068 |
| | | | 710/301 |
| 2018/0052793 A1 | 2/2018 | Fang | |
| 2019/0278360 A1 | 9/2019 | Nayak et al. | |
| 2021/0124705 A1* | 4/2021 | Zhai | G06F 13/4022 |
| 2021/0280261 A1* | 9/2021 | Yang | G06F 3/0604 |

OTHER PUBLICATIONS

TW Office Action for Application No. 110101366, dated Mar. 22, 2022, w/ First Office Action Summary.
TW Search Report for Application No. 110101366, dated Mar. 22, 2022, w/ First Office Action.

* cited by examiner

300

MUX unit register example:
When n=8

| | Bit | Type | Default | Definition |
|---|---|---|---|---|
| 310 | [15:12] | RW | 0 | SPI mode<br>0000: Standard mode<br>0001: Dual mode<br>0010: Quad mode<br>0011: Reserved<br>⋮<br>1111: Reserved |
| 320 | [11:8] | RW | 0 | SPI select when verify<br>0000: SPI flash 1 select<br>⋮<br>0111: SPI flash 8 select<br>1000: Reserved<br>⋮<br>1111: Reserved |
| 344 | [7] | RW | 0 | SPI_8 enable when program<br>0: Enable |
| 342 | [6] | RW | 0 | SPI_7 enable when program<br>0: Enable |
| 340 | [5] | RW | 0 | SPI_6 enable when program<br>0: Enable |
| 338 | [4] | RW | 0 | SPI_5 enable when program<br>0: Enable |
| 336 | [3] | RW | 0 | SPI_4 enable when program<br>0: Enable |
| 334 | [2] | RW | 0 | SPI_3 enable when program<br>0: Enable |
| 332 | [1] | RW | 0 | SPI_2 enable when program<br>0: Enable |
| 330 | [0] | RW | 0 | SPI_1 enable when program<br>0: Enable |

FIG. 3

METHOD AND SYSTEM FOR PARALLEL FLASH MEMORY PROGRAMMING

TECHNICAL FIELD

The present disclosure relates generally to writing images to multiple flash memories in computing devices. More particularly, aspects of this disclosure relate to a system that efficiently updates data stored on multiple flash devices.

BACKGROUND

Servers are employed in large numbers for high demand applications such as network based systems or data centers. The emergence of the cloud for computing applications has increased the demand for data centers. Data centers have numerous servers that store data and run applications accessed by remotely-connected, computer device users. A typical data center has physical chassis structures with attendant power and communication connections. Each rack may hold multiple computing servers and storage servers. Each individual server has multiple identical hardware components such as processors, storage cards, network interface controllers, and the like. Many hardware components, such as processor cores, require identical firmware routines such as a basic input output system (BIOS) executed by the processor core to perform functions such as data input and output.

Firmware for hardware components such as BIOS firmware (the BIOS image) is typically stored on a Serial Peripheral Interface (SPI) EEPROM flash memory device on the motherboard of a server. The available space to store the BIOS image depends on the capacity of an EEPROM as per the hardware design of the EEPROM.

In order to increase flexibility and simultaneous operation of identical hardware components, hardware designs may use multiple SPI EEPROMs to store the same image for the identical hardware components. Generally, in a computer device such as a server or a switch system, there are one or more SPI flash memories to support different hardware components. For example, components such as processor cores require firmware such as boot code, data code, initialization code, and other code. This firmware is stored in a corresponding SPI flash memory. The firmware is responsible for performing boot or initialization operations for the CPU or other key chips.

Typically, bugs may be found in existing firmware or new functions may be added in new firmware versions. Thus, a SPI flash memory will often need to be written over with new code. When there are multiple flash memories in a computing device, it will often take a long time to write the new firmware to the memories, thus resulting in excessive downtime to the computing device. The time required to write a new image to all SPI flash memories in a computing device is based on the program data size, clock frequency, number of flash memories, and other factors.

Flash memory device storage size is usually defined by the memory requirements of an application, the flash device specification, or the vendor. Such device parameters cannot be changed. Although SPI clock frequency can be increased to increase memory operation, such an increase is limited by PCB layout, trace length, and the write speed of the flash memory chip.

FIG. 1 shows a prior art system 10 that employs a traditional SPI flash memory programming routine. The system 10 includes a controller 12, a MUX unit 14, and a series of SPI flash memories 16. In this example, there are 1 to n SPI flash memories 16. The SPI flash memories 16 each store identical data, such as firmware images, that are accessible to corresponding identical hardware components. The MUX unit 14 allows programing data to be input and then written to a selected one of the 1 to n SPI flash memories 16. The controller 12 is coupled to a control interface 20, such as an I2C interface, through a general purpose input/output (GPIO) pin. The controller 12 is coupled to the MUX unit 14 through a SPI bus 22. The programming, such as a firmware image, is sent by the controller 12 through the SPI bus 22. A signal from the controller 12 to the control interface 20 selects one of a series of output pins 24 of the MUX unit 14. The input programming from the SPI bus 22 is routed through the selected output pin 24, and the firmware is transmitted to one of the SPI flash memories 16 connected to the selected output pin 24.

In this example, the controller 12 programs each flash memory 16 separately, and in sequence. Thus, the controller 12 first selects one of the output pins 24 of the MUX unit 14 through the control interface 20. Once selected, the controller 12 sends the programming through the SPI bus 22 to the flash memory 16 connected to the selected output pin 24. As the first flash memory 16 is programed, the remaining flash memories 16 wait in turn for programming. After the firmware image is sent over the SPI bus 22, a verification signal is returned from the flash memory 16 selected by the MUX 14 to verify a successful write of the firmware image. After verification, the controller 12 selects the next memory device 16, and repeats the programming and verification, until all the memories 16 have received the firmware image.

Because all of the flash memories 16 are programed with the same firmware image, only one of the firmware images has to be verified. In this example, the flash memories 16 are programmed one at a time. Each of the flash memories 16 return a verification signal to the controller 12 as the full code written to the flash memory 16 is verified. The start to end time for writing to all of the memory devices includes the time to write the code on one of the flash memories 16, and the time to verify the code on one of the flash memories 16. Thus, the total time required to write to all of the flash memories 16 is the time to program one flash memory added to the time to verify the programming. This resulting time is multiplied by the total number of flash memories 16, plus the total selection time for selecting the outputs of the MUX 14. The update routine for the known system 10 therefore creates substantial delays in distributing new firmware images to multiple flash memories on a computing device.

Thus, there is a need for a routine that efficiently programs multiple flash memories on a computing system. There is a need for a system with a modified MUX that addresses any number or all of a plurality of flash memories for simultaneous writing of firmware images to those memories. There is also a need for a system that controls a verification process for selected programming memories.

SUMMARY

One disclosed example is a computing system with a switching unit that includes an input and multiple outputs. The switching unit connects the input to one or more of the outputs. Each of a plurality of flash memory devices is coupled to one of the outputs of the switching unit. A control bus is coupled to the switching unit. The control bus carries a control signal to select one or more of the outputs for connection to the input. A programming interface bus is coupled to the input of the switching unit. A controller is coupled to the control bus and the programming interface bus. The controller provides programming for the flash memory devices over the programming interface bus.

A further implementation of the example system is where the controller is a baseboard management controller. Another implementation is where the controller selects a single memory device to send a verification over the programming interface bus to the controller. Another implementation is where the verification is one of full verification of the programming or a checksum of the programming. Another implementation is where the switching unit includes a control register. The control register includes bits to select the outputs to be connected to the input, and bits to select the single memory device to send the verification. Another implementation is where the switching unit is one of a FPGA, a CPLD, a PLD or an ASIC. Another implementation is where the control interface is an I2C bus. Another implementation is where the programming interface bus is a SPI interface. Another implementation is where the memory devices are SPI flash memories. Another implementation is where the system includes a plurality of hardware components. Each of the plurality of hardware components accesses a corresponding one of the memory devices. The programming is a firmware image for operating each of the plurality of hardware components. Another implementation is where the system includes a second programming interface bus coupled to the input of the switching unit. The system includes a second controller coupled to the control bus and the second programming interface bus. The second controller provides programming over the second programming interface bus to the memory devices. Another implementation is where the system includes a first expansion card coupled to the control bus. A first set of the memory devices are on the first expansion card. The first expansion card includes a first switching device having an input coupled to one of the outputs of the switching unit. The switching device includes a set of outputs each coupled to a corresponding memory device of the first set of memory devices. Another implementation is where the system includes a second expansion card coupled to the control bus. A second set of the memory devices is on the second expansion card. The second expansion card includes a second switching device having an input coupled to one of the outputs of the switching unit. The second switching device has a set of outputs each coupled to a corresponding memory device of the second set of memory devices.

Another disclosed example is a method of simultaneously programming a plurality of memory devices in a computing system. One or more of a plurality of outputs of a switching unit is selected. The switching unit includes an input. A control signal is sent from a controller over a control bus to the switching unit to connect the input to the selected outputs. Programming is provided from the controller over a programming interface bus to the input. The programming is sent to a plurality of flash memory devices. Each of the plurality of flash memory devices is coupled to one of the selected outputs of the switching unit.

A further implementation of the example system is where the controller is a baseboard management controller. The switching unit is one of a FPGA, a CPLD, a PLD or an ASIC. The control interface is an I2C bus. The memory devices are SPI flash memories. The programming interface bus is a SPI interface. Another implementation is where the method includes selecting a single memory device of the plurality of memory devices to send a verification. The programming is verified via the selected memory device. The verification is sent over the programming interface bus to the controller. Another implementation is where the verification is one of full verification of the programming or a checksum of the programming. Another implementation is where the switching unit includes a control register. The control register includes bits to select the outputs to be connected to the input, and bits to select the single memory device to send the verification. Another implementation is where the method includes a plurality of hardware components accessing a corresponding one of the memory devices. The programming is a firmware image for operating each of the plurality of hardware components. Another implementation is where the method includes selecting one or more of a plurality of outputs of the switching unit via a second controller. A control signal from the second controller is sent over the control bus to the switching unit to connect the input to the selected outputs. Programming is provided from the second controller over a second programming interface bus to the input. The programming is sent to the plurality of flash memory devices. Each of the plurality of flash memory devices is coupled to one of the selected outputs of the switching unit.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 3 is a table showing the selections for a control register for the modified MUX in the example system in FIG. 2;

Figure 1:
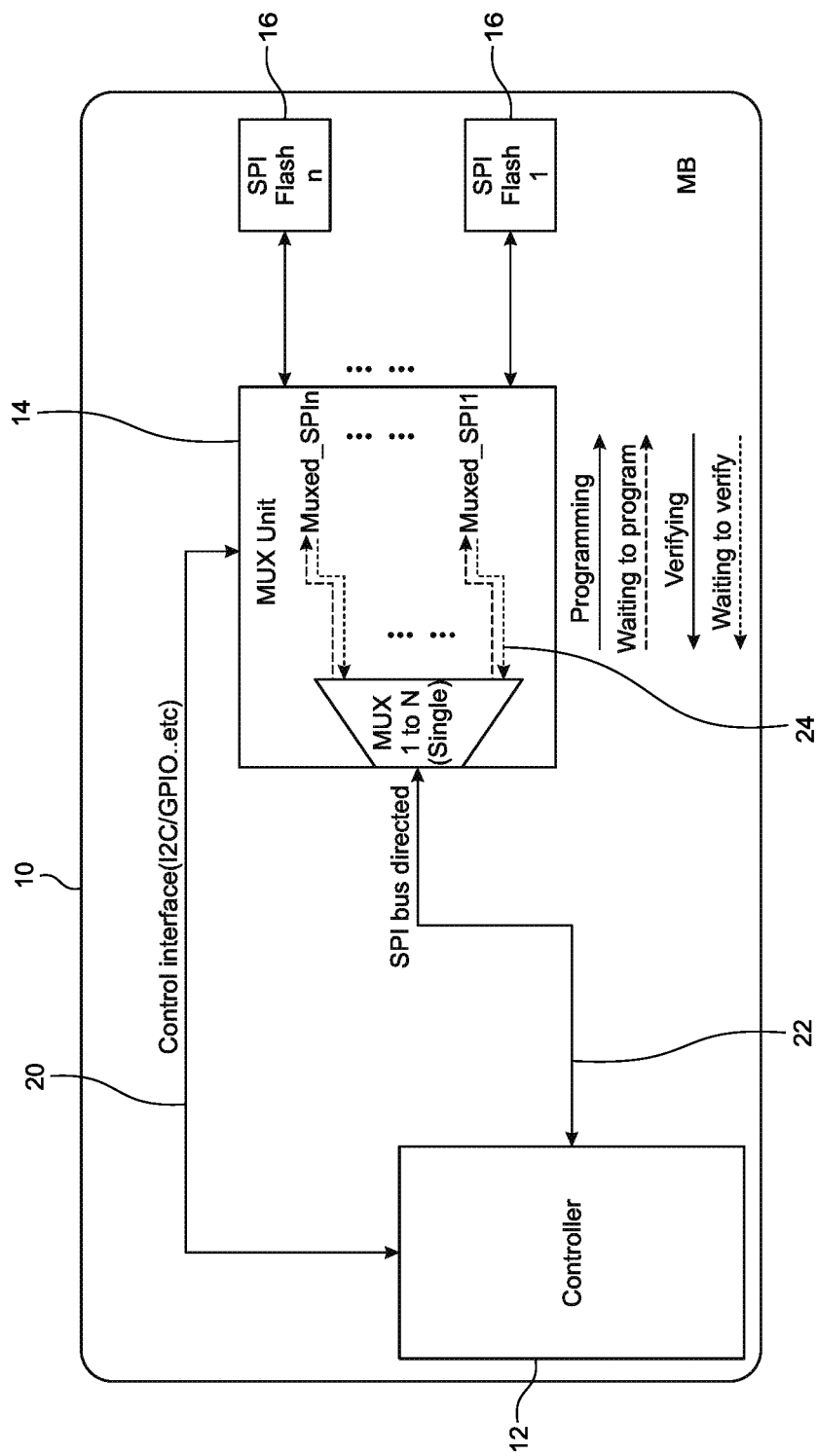
FIG. 1 is a prior art system that shows a sequence of providing firmware images to multiple flash memory devices.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The examples disclosed herein include a system and method to program multiple flash memory devices in an efficient manner. The programming occurs through a modified multiplexer that allows the same firmware image to simultaneously be written to multiple flash memory devices. The process therefore decreases the required time to update a firmware image for multiple flash memory devices.

Figure 2:
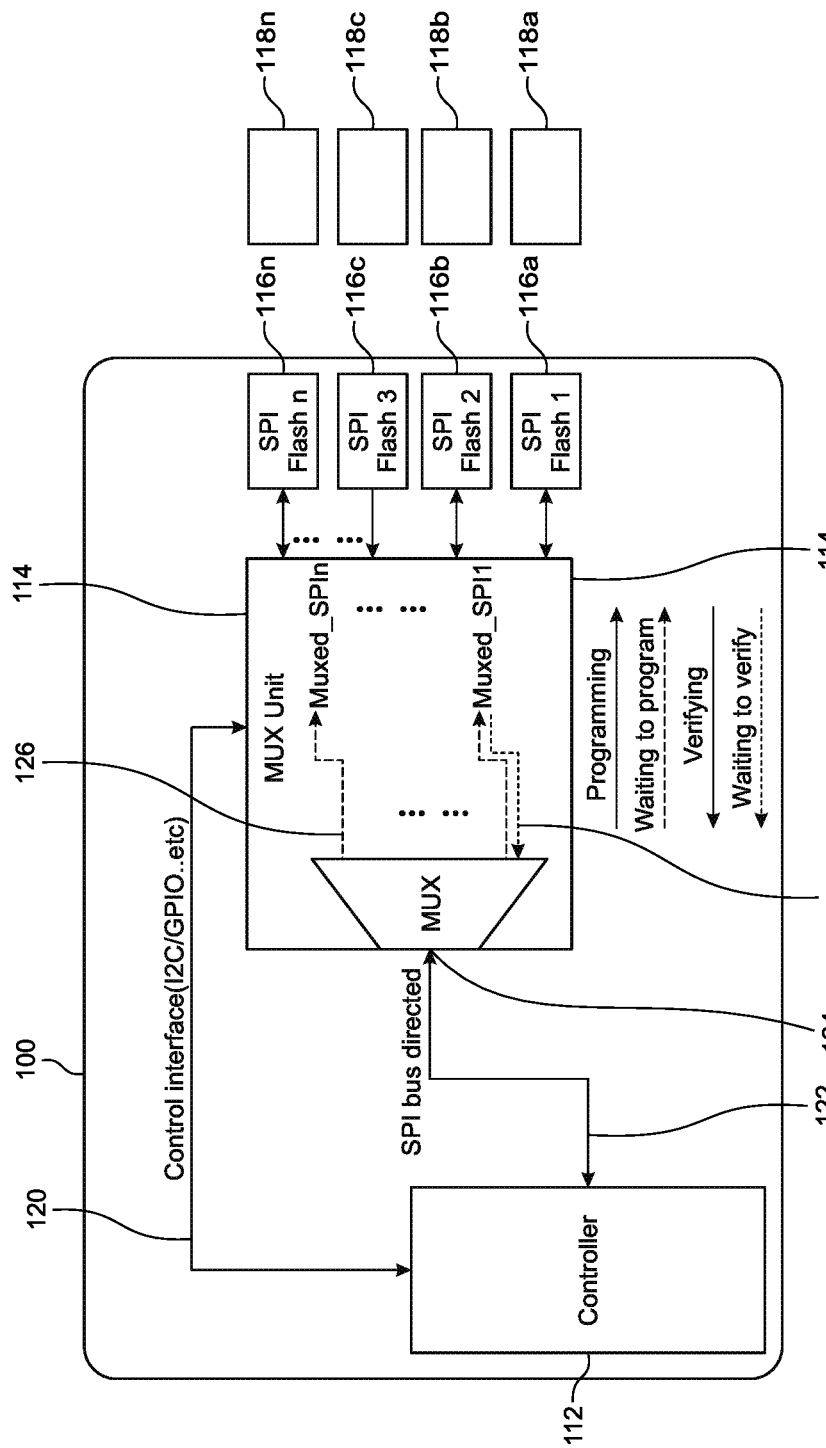
FIG. 2 is an example system for more efficient simultaneous provision of firmware images to multiple flash memory devices.

FIG. 2 shows an example computing system 100 that efficiently simultaneous programs SPI flash memory devices. The computing system 100 may be a server, a switch, or any other computing device. The system 100 includes a controller 112, a MUX unit 114, and a series of memories 116a, 116b, 116c, and 116n. In this example, the memories 116a, 116b, 116c, and 116n are SPI flash memory devices. However, other memory devices such as a micro SID card, a dataflash and simpler 25Cxx series SPI EEPROMs may be used. In this example, there are 1 to n SPI flash memories, such as the first memory 116a and the last memory 116n, that are numbered consecutively. In this example, the controller 112 is any suitable controller device such as a central processing unit (CPU), microcontroller unit (MCU), baseboard management controller (BMC), or the like. The controller 112 includes different interfaces such as an SPI interface, an I2C interface, a PCIe interface, or a LPC interface that allows communication with other hardware components through buses on the system 100. The controller 112 includes at least one general purpose input output (GPIO) pin that allows signals to be received by or transmitted to the controller 112.

In this example, the MUX unit 114 is a switching device that that routes an input through one or more multiple outputs, that are each connected to one of the memories 116a, 116b, 116c, and 116n. In this example, these functions are programmed into a complex programmable logic device (CPLD). However, the MUX unit 114 may be any suitable device such as a field programmable gate array (FPGA), a programmable logic device (PLD), an application specific integrated circuit (ASIC), a programmable controller, or the like, that allows the functions described herein to be performed. The output or outputs that the MUX unit 114 routes the input through is set by a control register. In this example the MUX unit 114 has a single input 124 and eight outputs 126 that may be selected via the control register.

The MUX unit 114 allows programing, such as a firmware image, to be sent to a selected one or more of the 1 to n SPI flash memories such as the memories 116a, 116b, 116c, and 116n. In this example, there are eight SPI flash memories, including the memories 116a, 116b, 116c, and 116n, that all store identical data. For example, there may be eight hardware components, such as hardware components 118a, 118b, 118c, and 118n, that all operate with and access the same programmed data in the corresponding memories 116a, 116b, 116c, and 116n. For example, the stored data in the memories 116a, 116b, 116c and 116n may include operating firmware, other images, code, or parameter data. Thus, during operation, the hardware component 118a accesses firmware and parameter data stored in the flash memory 116a. Correspondingly, the hardware component 118b accesses firmware and parameter data stored in the memory 116b during operation.

The controller 112 is coupled to a control interface 120 that is an I2C interface in this example. The control interface 120 is connected through a general purpose input/output (GPIO) pin on the controller 112. The control interface 120 relays control signals from the controller 112 to the MUX unit 114. The controller 112 is also coupled to the input 124 of the MUX unit 114 through a SPI bus 122. The programming, such as a firmware image, for the flash memories 116a, 116b, 116c, and 116n is sent by the controller 112 through the SPI bus 122. The control interface 120 allows the controller 112 to set the control register of the MUX unit 114 to select one or more of the output pins 126. The input from the SPI bus 122 is routed through the selected output pin or pins 126. The firmware image is transmitted to one or more of the SPI flash memories 116a, 116b, 116c, and 116n, according to the selection of the control register of the MUX unit 114.

In this example, the controller 112 can program multiple ones of the flash memories 116a, 116b, 116c, and 116n simultaneously. Thus, the controller 112 first selects the output pins 126 for connection to the input 124 by setting the control register of the MUX unit 114 through the control interface 120. Once selected, the controller 112 programs multiple flash memories 116a, 116b, 116c, and 116n by sending the programming through the input 124. The MUX unit 114 is set to simultaneously send the received programming to the selected output pins 126. After the programming is sent over the SPI bus 122, a verification signal is returned from the first flash memory of the memories 116a, 116b, 116c, and 116n, which are selected by the MUX unit 114 for verification. The other memories selected for verification will then send their verification signals back to the controller 112 in turn. The total programming time for the selected memories of the memories 116a, 116b, 116c, and 116n is thus the programming time for a single memory and the time for all the verification signals to be sent.

Thus, programming one flash memory device requires time T. In order to program n flash devices, the above described process will require T time. Thus, if n flash devices use the same programming e.g., a firmware image, the described process may be employed to program all of the flash memory devices at the same time. Thus, the programming time for multiple flash memories is the programing time for a single flash memory regardless of the number of flash memories in the system 100.

In contrast to the prior art example system 10 in FIG. 1, the example flash programming in the computing system 100 in FIG. 2 allows providing programming to either a single flash memory, several flash memories, or all flash memories in the system 100. Verification may be optionally performed for a single flash memory of the memories 116a, 116b, 116c, and 116n, or any other number of the flash memories. The full programming may be verified, or the programming may be verified through a checksum process. The time for programming all the flash memories in a one to one manner for the computing system 100 in FIG. 2 is the programming time for a single flash memory added to the verification time multiplied by the number of flash memories that are verified, and added to the selection time of the MUX unit 114 multiplied by the number of flash memories that are verified.

In this example, the SPI bus 122 has four signal lines including a serial clock line, a slave select line, a master in slave in (MOSI) line, and a master out slave out (MOSO) line. There are standard, dual, and quad modes for the SPI flash memories 116a, 116b, 116c, and 116n. The control interface 120 is used by the controller 112 to control the status of the MUX unit 114 through setting the MUX control register.

The controller 112 thus writes programming data for one or more of the memories 116a, 116b, 116c, and 116n by the following process. The controller 112 first sets the MUX control register with the selection of the number of flash memory devices such as 116a, 116b, 116c, and 116n that will be programmed. The controller 112 also sets the MUX control register with the selection of which of those memory devices will be verified. If a default setting is selected for the programming process, the control register does not have to be set as all of the flash memory programming is selected. The controller 112 assigns a file, which may be firmware, image, code, or parameter data to start the programming procedure and selects the verification mode. The verification mode may be a full firmware image verification or a faster checksum process in this example. In this example, the default verification mode is a full firmware image verification. The controller 112 then transmits the programming, such as a firmware image, to the input 124 of the MUX unit 114 through the SPI bus 122. The MUX unit 114 sends the programmed data simultaneously to all of the selected memory devices connected to the selected outputs 126.

After programing all of the selected memory devices is finished, the routine executed by the controller 112 writes settings to the control register of the MUX unit 114 to select the memories of the memories 116a, 116b, 116c, and 116n that verify the programming. Each memory to be verified is selected in turn, and the controller 112 waits for a verification signal from the selected memory. The controller 112 then will update a status field to show that the necessary firmware has been written to the memories such as memories 116a, 116b, 116c, and 116n, and the verifications have been completed for those selected memories. Thus, during programming the controller 112 updates the programming status in the status field, and after the completion of the programming, the controller 112 generates a status report.

FIG. 3 shows a table 300 of the settings of the MUX control register that may be set by the controller 112 in FIG. 2 via the control interface 120. In this example, the MUX control register is a sixteen bit register, but larger or smaller registers may be used in proportion to the number of flash memory devices that require programming.

As shown in the table 300, bits 12-15 (310) of the register allow for setting a standard mode, a dual mode, or a quad mode for the SPI bus 122. The standard mode is where the SPI bus 122 specifies four logic signals (SCLK, CS, MOSI, and MISO). Bits 8-11 (320) of the register allow for setting for the specific output and corresponding memory device to be verified. Thus, a setting of 0000 selects the first SPI flash memory device 116a in FIG. 2 for verification, while a setting of 0111 selects the eighth flash memory device 116n in FIG. 2 for verification. As explained above, the controller 112 will activate the specific memory device for verification by enabling the corresponding bit according to the memory devices that require verification. Thus, if all eight memories require verification, the controller 112 enables each of the memory devices in sequence through the bits 8-11 (320) and receives a verification signal from each of them. If fewer than all memory devices require verification, the controller 112 will cycle through the required memory devices one at a time by setting the bits 8-11.

Bits 0-7 of the control register listed in the table 300 allow for selection of a specific memory device for receiving programming from the SPI bus 122. Thus, bit 0 (330) enables the first memory 116a to be programmed. Bit 1 (332) enables the second memory device 116b to be programmed. Bit 2 (334) enables the third memory device 116c to be programmed. Bit 3 (336) enables the fourth memory device to be programmed. Bit 4 (338) enables the fifth memory device to be programmed. Bit 5 (340) enables the sixth memory device to be programmed. Bit 6 (342) enables the seventh memory device to be programmed. Bit 7 (344) enables the eighth memory device 116n to be programmed. In this manner, the controller 112 can enable one, some, or all eight of the memory devices to be programmed simultaneously by setting the corresponding bit or bits of bits 0-7 of the control register.

Figure 4:
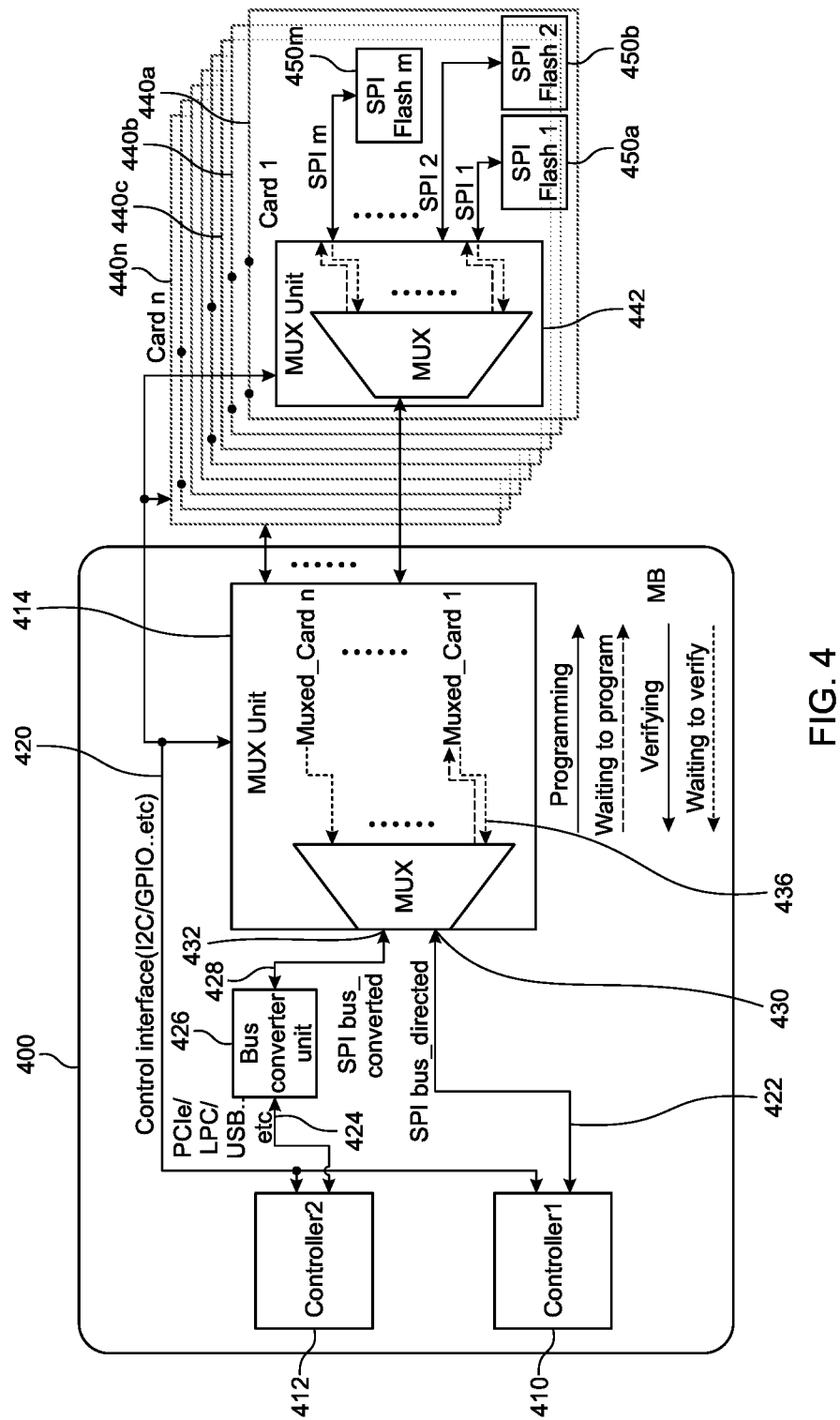
FIG. 4 is an alternate system for programming flash memories on multiple cards, according to certain aspects of the present disclosure.

FIG. 4 is an alternate computing system 400 that includes two controllers 410 and 412, and allows simultaneous programming of flash memory devices. The system 400 includes a MUX unit 414. The controllers 410 and 412 are coupled to a control interface 420 that allows them to select the outputs of the MUX unit 414. In this example, the controller 410 is coupled to an SPI bus 422. The controller 412 is coupled to another bus such as a PCIe bus 424. A bus converter unit 426 converts the bus signals on the PCIe bus 424 to a second SPI bus 428 that is coupled to the MUX unit 414.

In this example, the MUX unit 414 is a complex programmable logic device that is programmed as a switch. The MUX unit 414 allows for programming from one of two inputs 430 and 432 to be routed to one of more outputs 436. The SPI bus 422 is coupled to the input 430. The second SPI bus 428 is coupled to the input 432. In this example, the MUX unit 414 includes eight outputs 436.

The system 400 includes expansion cards such as expansion cards 440a, 440b, 440c, and 440n. Any number of identical expansion cards similar to the expansion card 440a may be used. The expansion cards such as expansion cards 440a, 440b, 440c, and 440n all include common hardware components with corresponding flash memory devices such as memories 450a, 450b, and 450m on the expansion card 440a. The identical hardware components on each the expansion cards are supported by identical firmware in multiple SPI flash memories. Each of the cards, such as the cards 440a, 440b, 440c, and 440d, are connected to an output 436 of the MUX unit 414.

In this example, the expansion card 440a includes a MUX unit 442 having an input that is coupled to one of the outputs 436 of the MUX unit 414. The expansion card 440a is also coupled to the control interface 420. The outputs of the MUX unit 442 are coupled to additional flash memory devices 450a, 450b, and 450m that correspond to hardware components (not shown) on board the card 440a.

Either of the controllers 410 or 412 may program the flash memory devices on any or all of the expansion cards 440a, 440b, 440c, and 440n. In this example, the programming from the controller 410 is routed through the SPI bus 422 to the MUX unit 414. The programming from the controller 412 is routed through the PCIe bus 424. The programming is converted by the bus converter 426 to the second SPI bus 428 to the MUX unit 414. Alternatively, the second controller 412 may have an SPI interface and thus communicate directly through a SPI bus. Other types of busses and corresponding interfaces on the controllers 410 and 412 may be used in conjunction with a bus converter such as the bus converter 426. For example, other interfaces may include a USB or LPC interface.

The system 400 allows for simultaneous programming of memory devices on the expansion cards 440a, 440b, 440c, and 440n. The MUX unit 414 can support a cascade between the expansion cards 440a, 440b, 440c, and 440n as each of the MUXs on the cards are connected in series with the MUX unit 414, the number of flash memories may be further expanded by adding additional MUX units in series. The control signals sent by a controller, such as the controller 410, through the control interface 420 allow selection of one or more of the expansion cards 440a, 440b, 440c, and 440n, as well as the corresponding memories, such as one or more of the memory devices 450a, 450b, and 450m. The programming from the controller may then be sent to all the selected memory devices. Alternatively, the controller 412 may send programming to all of the selected memory devices. Similar to the above process, verification may be made from selected memories via a control register on the MUX such as the MUX unit 442 on a selected expansion card such as a card 440a.

The system 400 realizes significant time savings in the programming routine for all of the memory devices. For example, a traditional system that programs each flash memory sequentially, such as the system 10 in FIG. 1 will require T*n*m+S for the programming process. T represents the time to program and verify a single flash memory. Thus, T is the programming time for a single flash memory P, added to the verification time V. n represents the number of expansion cards. m represents the number of flash memory devices on each expansion card. S represents the selection time, which may be defined as s*(n−1), where s is the time for the MUX unit 414 to select one card. The programming time where n=8; m=8; T=1 minute; P=0.5 min; V=0.5 min; s=0.05 seconds is therefore T*n*m+S (e.g., 1 minute*8*8+ 3.15 seconds)=64 minutes and 3.15 seconds total.

In contrast, using the routine described herein, if verification is not used, the programming is simply either T or T+s for programming in one minute or one minute and 0.05 seconds. If verification is performed by the flash memory devices, the total time is T+s*n*(m−1)+V*n*(m−1)=1 min+ 0.05 sec*8*(8-1)+0.5 min*8*(8-1) resulting in a programming time of 29 minutes and 2.8 seconds. Thus, the disclosed example programming process shortens the total programming time by around half.

Figure 5:
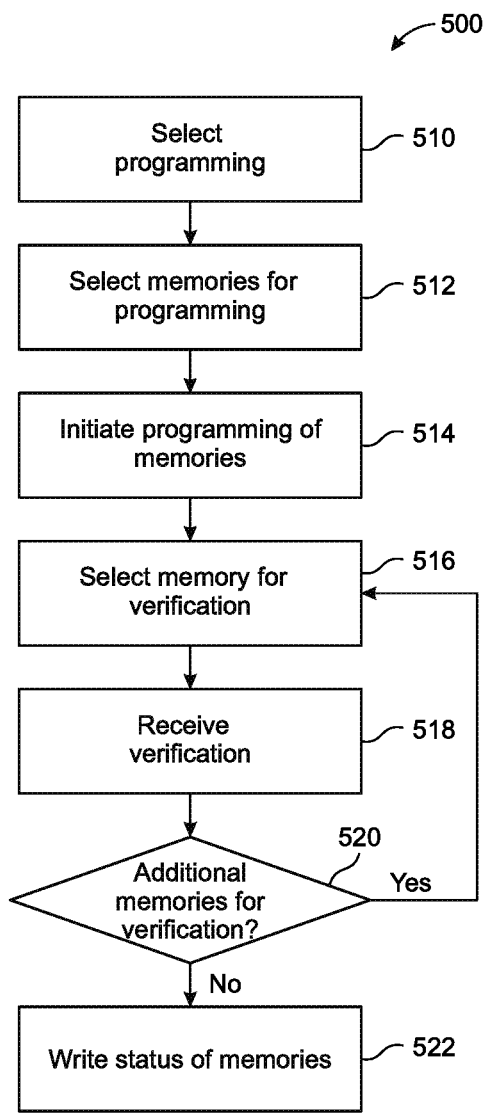
FIG. 5 is a flow diagram of an example routine to allowing simultaneous writing to multiple flash memory devices.

The improved process will proceed as follows in relation to the routine shown in FIG. 5. FIG. 5 is a flow diagram 500 of an example routine executed by the controller 112 in FIG. 2 to provide programming such as firmware images simultaneously to memory devices, according to certain aspects of the present disclosure. The flow diagram in FIG. 5 is representative of example machine readable instructions for the process of programming multiple SPI flash devices. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowchart illustrated in FIG. 5, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The controller 112 in FIG. 2 will first select the programming for the flash memory devices (510). The programming will be typically a firmware image to update the firmware stored in the flash memories. The controller 112 will then set the control register of the MUX unit 114 via the control interface 120 to select the flash memories to be programmed. The controller 112 will then initiate the programming by sending the programming to the MUX unit 114 input from the SPI bus 122 (514). After the programming is complete, the controller 112 will select the first memory device to be verified by the setting the control register (516). The memory device will send the verification and the controller receives the verification (518). After completion of the verification, the controller 112 determines whether there are additional memory devices that must be verified (520). If there are additional memory devices, the controller 112 will loop back and select the next memory device for verification (516). Once all of the memory devices have been verified, the controller 112 writes a status report (522). In this example, the status report includes information about the resulting programming of the flash memories and may list which flashes are programmed, which flashes are verified, and whether the programming and verification were successful.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A computing system comprising:
    a switching unit including an input and a plurality of outputs, the switching unit operable to connect the input to two or more of the plurality of outputs simultaneously;
    a plurality of hardware components operable to execute programming images, each of the hardware components having flash memory devices, each of the plurality of flash memory devices coupled to one of the plurality of outputs of the switching unit;
    a control bus coupled to the switching unit, the control bus carrying a control signal to select one or more of the plurality of outputs for connection to the input;
    a programming interface bus coupled to the input of the switching unit; and
    a controller coupled to the control bus and the programming interface bus, the controller operable to simultaneously provide identical programming images for execution by the hardware components over the programming interface bus to each of the plurality of the flash memory devices coupled to the outputs selected by the control bus.

2. The system of claim 1, wherein the controller is a baseboard management controller.

3. The system of claim 1, wherein the controller is operable to select a single memory device of the plurality of memory devices to send a verification over the programming interface bus to the controller.

4. The system of claim 3, wherein the verification is one of full verification of the programming or a checksum of the programming images.

5. The system of claim 3, wherein the switching unit includes a control register, wherein the control register includes bits to select the outputs to be connected to the input, and bits to select the single memory device to send the verification.

6. The system of claim 1, wherein the switching unit is one of a FPGA, a CPLD, a PLD or an ASIC.

7. The system of claim 1, wherein the control interface is an I2C bus.

8. The system of claim 1, wherein the programming interface bus is a SPI interface.

9. The system of claim 1, wherein the memory devices are SPI flash memories.

10. The system of claim 1, further comprising:
    a second programming interface bus coupled to the input of the switching unit; and
    a second controller coupled to the control bus and the second programming interface bus, the second controller operable to select a plurality of the memory devices and provide programming over the second programming interface bus to the selected plurality of memory devices.

11. The system of claim 1, further comprising a first expansion card coupled to the control bus, wherein a first set of the memory devices are on the first expansion card, the first expansion card including a first switching device having an input coupled to one of the outputs of the switching unit and a set of outputs each coupled to a corresponding memory device of the first set of memory devices.

12. The system of claim 11, further comprising a second expansion card coupled to the control bus, wherein a second set of the memory devices is on the second expansion card, the second expansion card including a second switching device having an input coupled to one of the outputs of the switching unit and a set of outputs each coupled to a corresponding memory device of the second set of memory devices.

13. A method of simultaneously programming a plurality of memory devices in a computing system, the method comprising:
    selecting two or more of a plurality of outputs of a switching unit simultaneously, the switching unit including an input;
    sending a control signal from a controller over a control bus to the switching unit to connect the input to the selected outputs; and
    providing a programming image from the controller over a programming interface bus to the input, the programming image for execution by hardware components being simultaneously sent to a plurality of hardware components each operable to execute the programming image, each of the hardware components having flash memory devices, each of the plurality of flash memory devices coupled to one of the selected outputs of the switching unit.

14. The method of claim 13, wherein the controller is a baseboard management controller, the switching unit is one of a FPGA, a CPLD, a PLD or an ASIC, the control interface is an I2C bus, the memory devices are SPI flash memories, and the programming interface bus is a SPI interface.

15. The method of claim 13, further comprising:
    selecting a single memory device of the plurality of memory devices to send a verification;
    verifying the programming images via the selected memory device; and
    sending the verification over the programming interface bus to the controller.

16. The method of claim 15, wherein the verification is one of full verification of the programming images or a checksum of the programming images.

17. The method of claim 15, wherein the switching unit includes a control register, wherein the control register includes bits to select the outputs to be connected to the input, and bits to select the single memory device to send the verification.

18. The method of claim 13, further comprising:
selecting one or more of a plurality of outputs of the switching unit via a second controller;
sending a control signal from the second controller over the control bus to the switching unit to connect the input to the selected outputs; and
providing programming from the second controller over a second programming interface bus to the input, the programming being sent to the plurality of flash memory devices, each of the plurality of flash memory devices coupled to one of the selected outputs of the switching unit.

* * * * *